(12) United States Patent
Hansen et al.

(10) Patent No.: US 6,925,800 B2
(45) Date of Patent: Aug. 9, 2005

(54) WAVE POWER MACHINE

(75) Inventors: Niels Arpe Hansen, Esbjerg (DK); Keld Hansen, Gesten (DK)

(73) Assignee: Wave Star Energy APS, Charlottenlund (DK)

( * ) Notice: Subject to any disclaimer, the term of this patent is extended or adjusted under 35 U.S.C. 154(b) by 0 days.

(21) Appl. No.: 10/275,429

(22) PCT Filed: May 8, 2001

(86) PCT No.: PCT/DK01/00317
§ 371 (c)(1),
(2), (4) Date: May 5, 2003

(87) PCT Pub. No.: WO01/92644
PCT Pub. Date: Dec. 6, 2001

(65) Prior Publication Data
US 2003/0167765 A1 Sep. 11, 2003

(30) Foreign Application Priority Data

May 8, 2000 (DK) .................................. 2000 00163 U
May 8, 2000 (DK) .................................. 2000 00162 U
Apr. 9, 2001 (DK) ....................................... 2001 00573

(51) Int. Cl.[7] ............................................... F03C 1/00
(52) U.S. Cl. .............................. 60/497; 60/500; 60/505
(58) Field of Search ........................ 60/495, 496, 497, 60/500, 505

(56) References Cited
U.S. PATENT DOCUMENTS

| 2,700,874 | A | | 2/1955 | Roure |
| 4,319,454 | A | | 3/1982 | Lucia |
| 4,389,843 | A | | 6/1983 | Lamberti |
| 4,598,547 | A | * | 7/1986 | Danihel ....................... 60/507 |
| 4,651,667 | A | * | 3/1987 | de Boer et al. ............. 114/77 A |
| 5,084,630 | A | * | 1/1992 | Azimi ........................... 290/53 |
| 5,359,229 | A | | 10/1994 | Youngblood |
| 5,507,943 | A | * | 4/1996 | Labrador .................... 210/136 |

FOREIGN PATENT DOCUMENTS

| CA | 2075470 | 2/1994 |
| DE | 2839018 | 3/1980 |
| DE | 4338103 | 5/1995 |
| DE | 19515138 | 10/1996 |
| FR | 2436888 | 4/1980 |

* cited by examiner

Primary Examiner—Hoang Nguyen
(74) Attorney, Agent, or Firm—Harness, Dickey & Pierce, P.L.C.

(57) ABSTRACT

The wave force machine as such is constructed in such a way that it is capable of utilizing the upward force from the waves with (FIG. 1) the force from float (1) and rocker arm (3) via rocker arm pipe (4), wherein 1 or more lock bearings are provided, which transfer the upward force causing the driving force shaft (8) to rotate in the same direction. On each driving force shaft (8) may be one after the other of mounted float, rocker arm and rocker arm pipe with lock bearings after the other, and several driving force shafts (FIG. 6) (6,7,8 and 9) may be interconnected both horizontally and vertically to toothed wheel (1, 2, 3, 10, 11, 12, 13 and 14) shown here with 4 driving force shafts, but in principle any number of shafts may be interconnected. The total force from the driving force shafts may be brought to gearbox and electric generator and used in electricity production. 3 wave force machines may e.g. be interconnected to form e.g. a star, so that the force from 3 wave force machines may be gathered in the star point, wherein gearbox and electric generator are positioned, (cf. FIG. 9). Alternatively, several star points are interconnected, as shown in to from e.g. a hexagon.

23 Claims, 23 Drawing Sheets

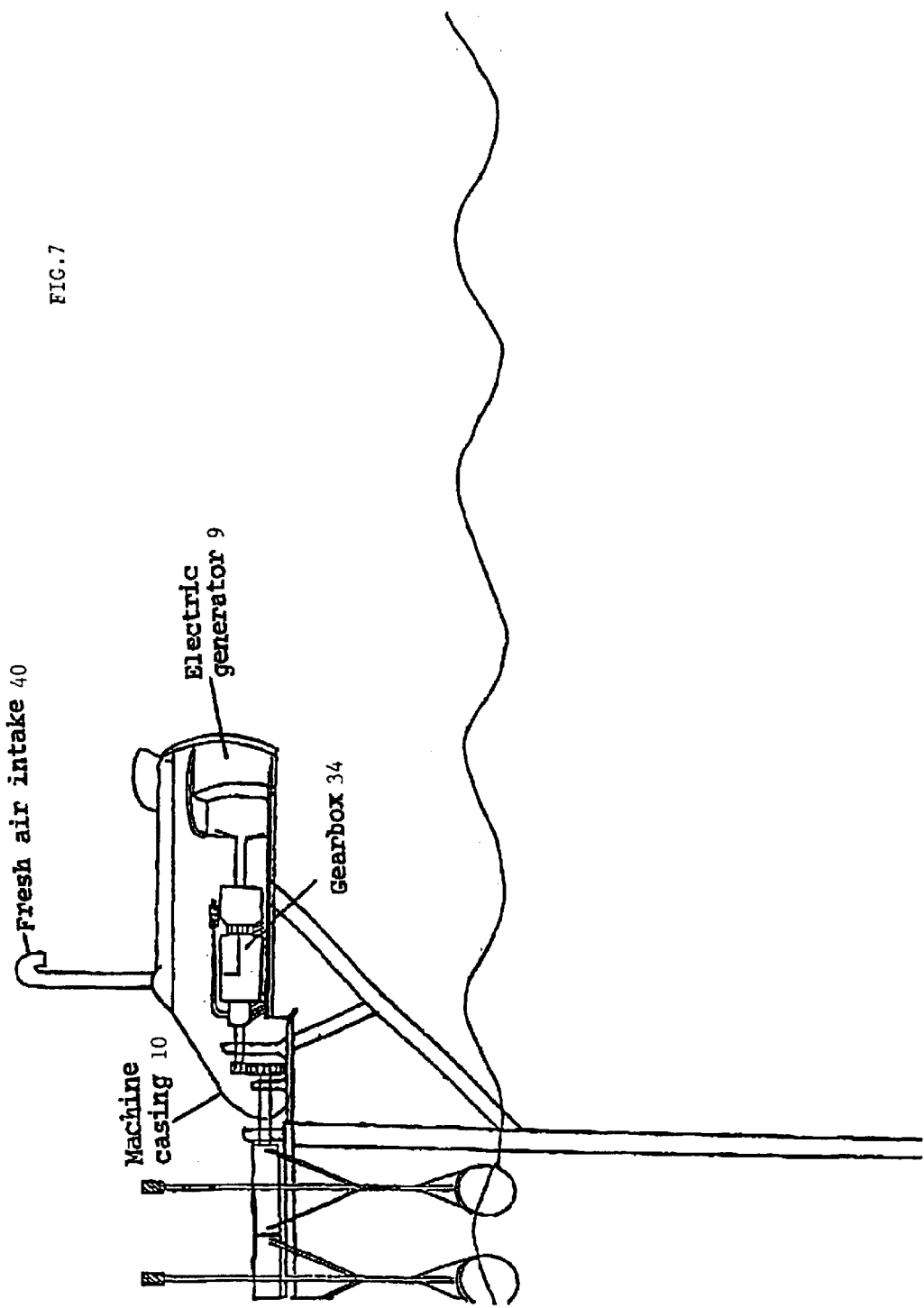

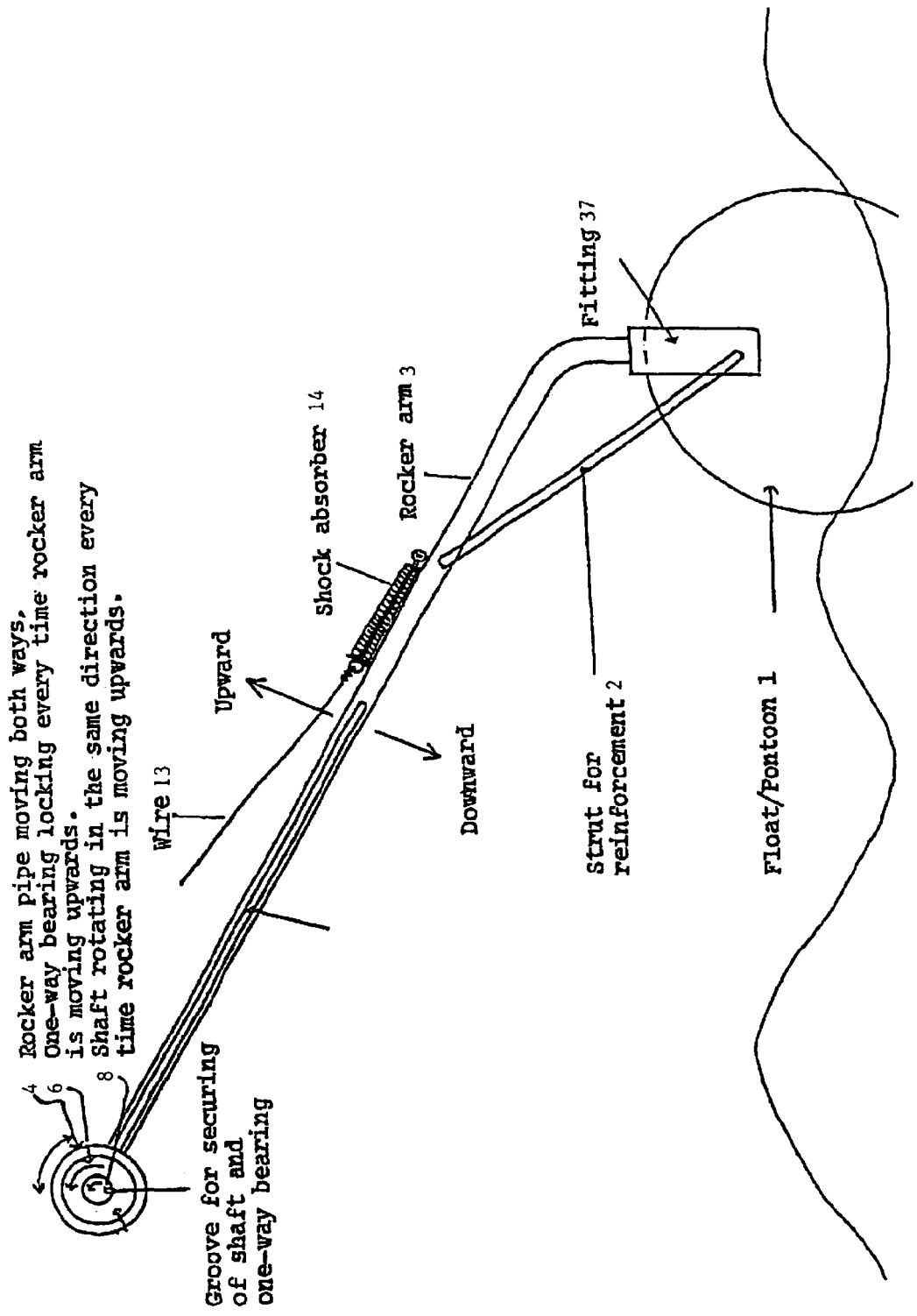

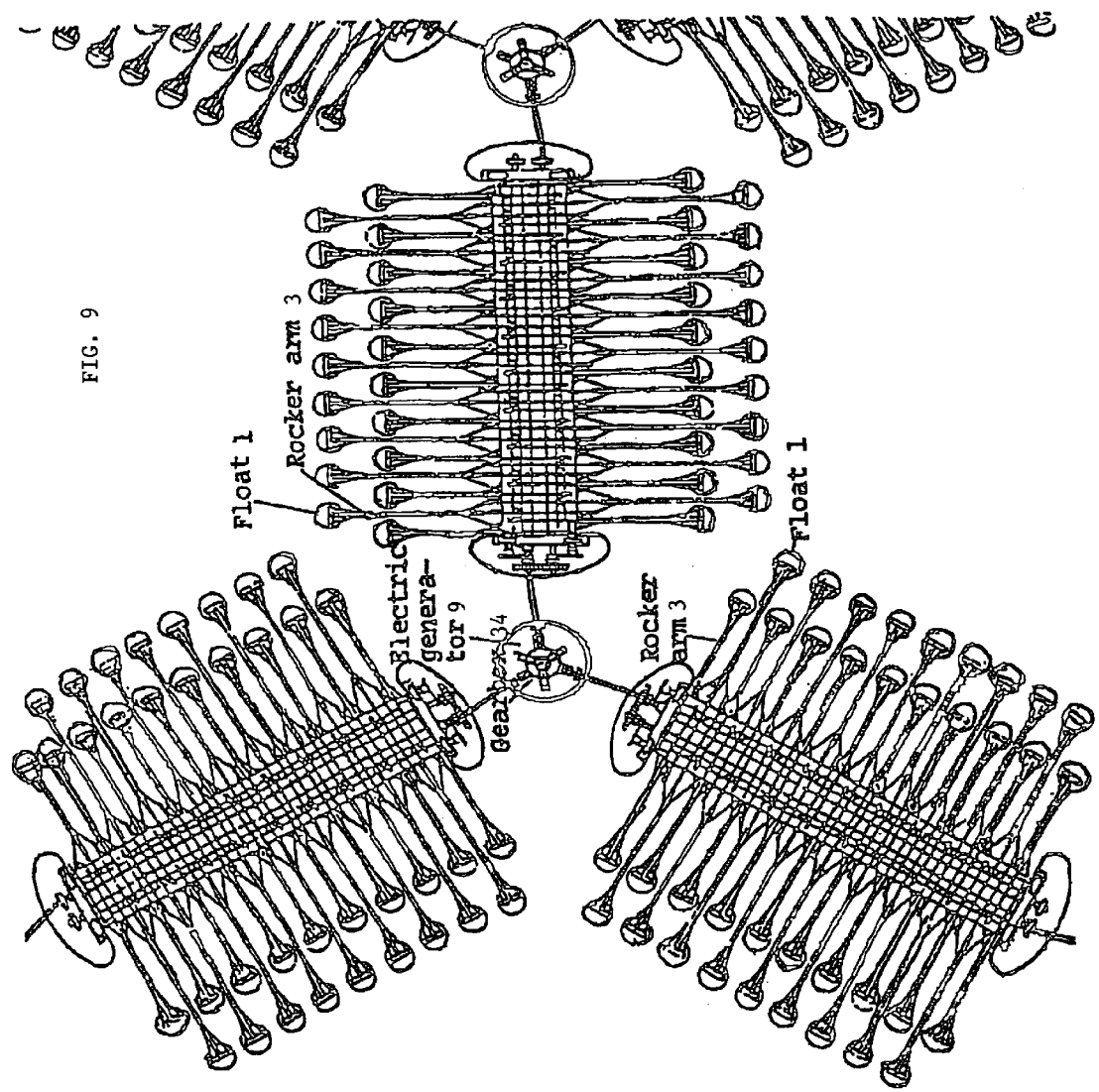

12 ea  Wave force machines
 9 ea  Concrete pillars
 3 ea  Gearboxes
 3 ea  Electric generators

WAVE POWER MACHINE

The present invention relates to a wave force system comprising floats on rocker arms ending in rocker arm pipes, wherein lock bearings are provided, mounted on one or more force shafts attached to concrete pillar, boat or the like and interconnected to allow the total force to be transferred to gearbox and electric generator, for use in seas, lakes, oceans and other water reservoirs with upward and downward wave movements, the purpose of which being that the force shaft constantly rotates and transfers the force to gearbox and generator capable of producing electricity. Alternatively, the wave force machine may be equipped with blade arms FIG. 17. This model may be positioned in waters with much current, e.g. in Lillebaelt, or in rivers or similar places.

The wave force machine comprises an electric hoist, wherein the electric motor of the electric hoist is activated from control box, the rocker arms being raised from the water either if the wind is too strong, the waves are too high, the water temperature is too low, the gear or generator temperature is too high, or during repairs of the wave force system or other things, and the wave force machine interrupts production.

The wave force machine may be set up on concrete blocks or adjustable feet at the bottom of the sea or may be mounted on a floating object (e.g. a boat), or the like.

In previous, known floats on rocker arms, this force was transferred to hydraulics, air pressure or filling of liquid. This invention gathers several floats and rocker arms and their upward force on one or more force shafts that is/are attached to concrete pillars, boat or the like, that rotate in the same direction as and are interconnected by means of toothed wheels.

Machine casing with toothed wheels, gearbox, control box and electric generator is watertight, as are all movable parts, between rocker arms. The toothed wheels placed at the end of the driving force shafts are also placed in a watertight casing.

According to the invention the wave force machine is characterised in that the floats attached to the rocker arms and ending in the rocker arm pipes, wherein the lock bearings are provided, are capable of transferring the upward force from the wave to the force shaft to make the latter turn. This downward movement is subject to free-wheeling.

The machine is constructed to be so long that it is situated over at least 2 waves, which means that floats are moving upward all the time causing the force shaft to rotate constantly.

The wave force machine is characterised in that one float on rocker arm and rocker arm pipe with lock bearings after the other may be placed on the same driving force shaft, and several systems of driving force shafts may be interconnected, and since the entire machine is so long that at least 2 wave crests are moving through the machine, this will cause the driving force shafts to rotate in the same direction all the time.

One or more driving force shafts can be interconnected both horizontally and vertically by means of toothed wheel on each wave force machine, and the total force can be utilized in gearbox and electric generator (FIG. 4). Four force shafts are shown in the drawing, but in principle six or any other combination of shafts can be provided.

Several wave force machines can be interconnected to form e.g. a star, in which the force shafts of the 3 wave force machines are joined and e.g. a gearbox and an electric generator are provided, or to form larger entities such as a hexagon (FIG. 20) or any other combination. By means of such combinations, reductions can be made with respect to concrete pillars, gearboxes and electric generators.

The electric hoist is also characterised in that when activated by a signal from the control box, the electric hoist can, by means of wires, raise the rocker arms from the water, a feature not seen previously, in order that the wave force machine is not destroyed during storm, ice formation or other conditions that would otherwise destroy the wave force machine. Simultaneously, the rocker arms can be raised from the water and the machine will stand still during e.g. repairs or service inspections.

The rocker arms are mounted with balance weight, allowing the entire buoyancy, and hence force, of the float to be utilized on the upward rocker arm. Free-wheeling occurs on the movement of the downward rocker arm.

When several wave force machines are interconnected to form e.g. a star or e.g. larger entities such as a hexagon or any other combination, a motor declutching of each force shaft may be established in each centre of force, thus allowing the gearbox and electric generator to be declutched e.g. during repairs.

The wave force machine is provided with float, rocker arm and rocker arm pipe (FIG. 14), wherein rocker arm pipe is constructed in such a way that it is made up of 2 halves separable during e.g. repairs of driving force shaft, bearings or other things. Each bearing is also separable.

The wave force machine is constructed in such a way that one or more gear locking arms (FIG. 18) is/are provided within each rocker arm pipe, each gear locking arm being attached to driving force shaft 8. The gear locking arms engage with gear bush 57 that is attached to the rocker pipe 3 which by means of groove with cotter 56 causes the driving force shaft to rotate in the case of upward wave movement, free-wheeling occurring in the case of downward movement.

The invention will be explained in greater detail below with reference to the drawings in which FIG. 1 is a top view of the wave force machine, including floats, rocker arms, rocker arm pipes, driving shafts, balance weights, bearings, toothed wheels, oiling and shaft extending to gearbox and electric generator.

FIG. 7 is a side view of the wave force machine, including a suggestion as to the positioning of gearbox and electric generator.

FIGS. 8a to 8d show a rocker arm, including floats, fittings, rocker arm, shock absorber, strut for reinforcement rocker arm pipe, one-way bearings and driving shaft.

FIG. 9 shows a suggestion as to how several wave force machines may be interconnected, seen from above.

Figure 1:
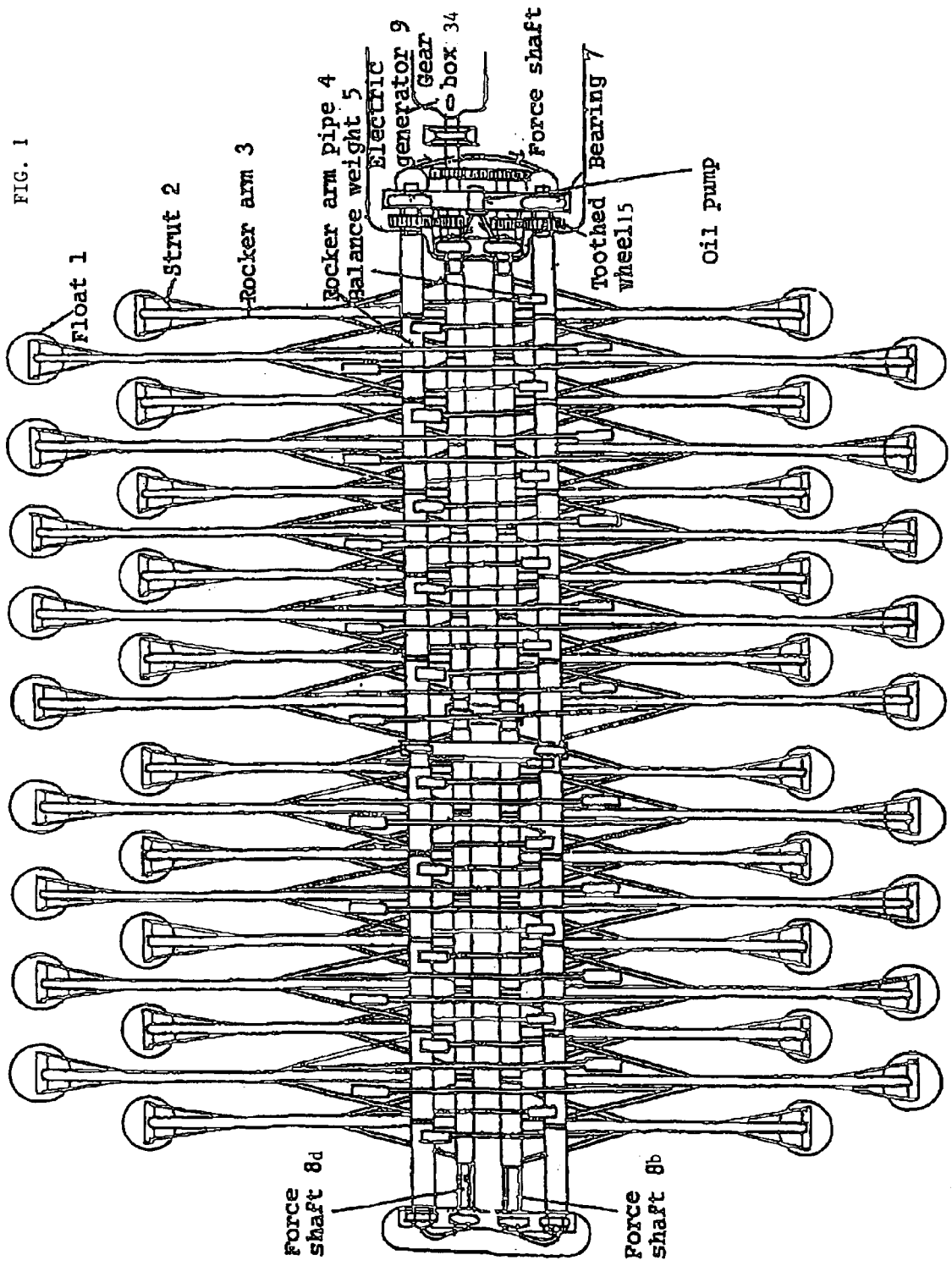

FIG. 1 is a top view of the wave force machine, including float 1, strut 2 for reinforcement, rocker arm 3, rocker arm pipe 4, wherein lock bearings are provided, balance weight 5, toothed wheel 6 interconnecting the force from the force shafts in such a way that the total force from the force shafts 8 can be gathered in gearbox and electric generator 9, 7 shows an ordinary bearing, wherein the force shaft runs. The drawing shows a wave force machine with 38 arms and four force shafts, but in principle the wave force machine may be connected to any number of floats, rocker arms and driving force shafts, and the floats 1 may in principle be designed in any manner.

Figure 2:
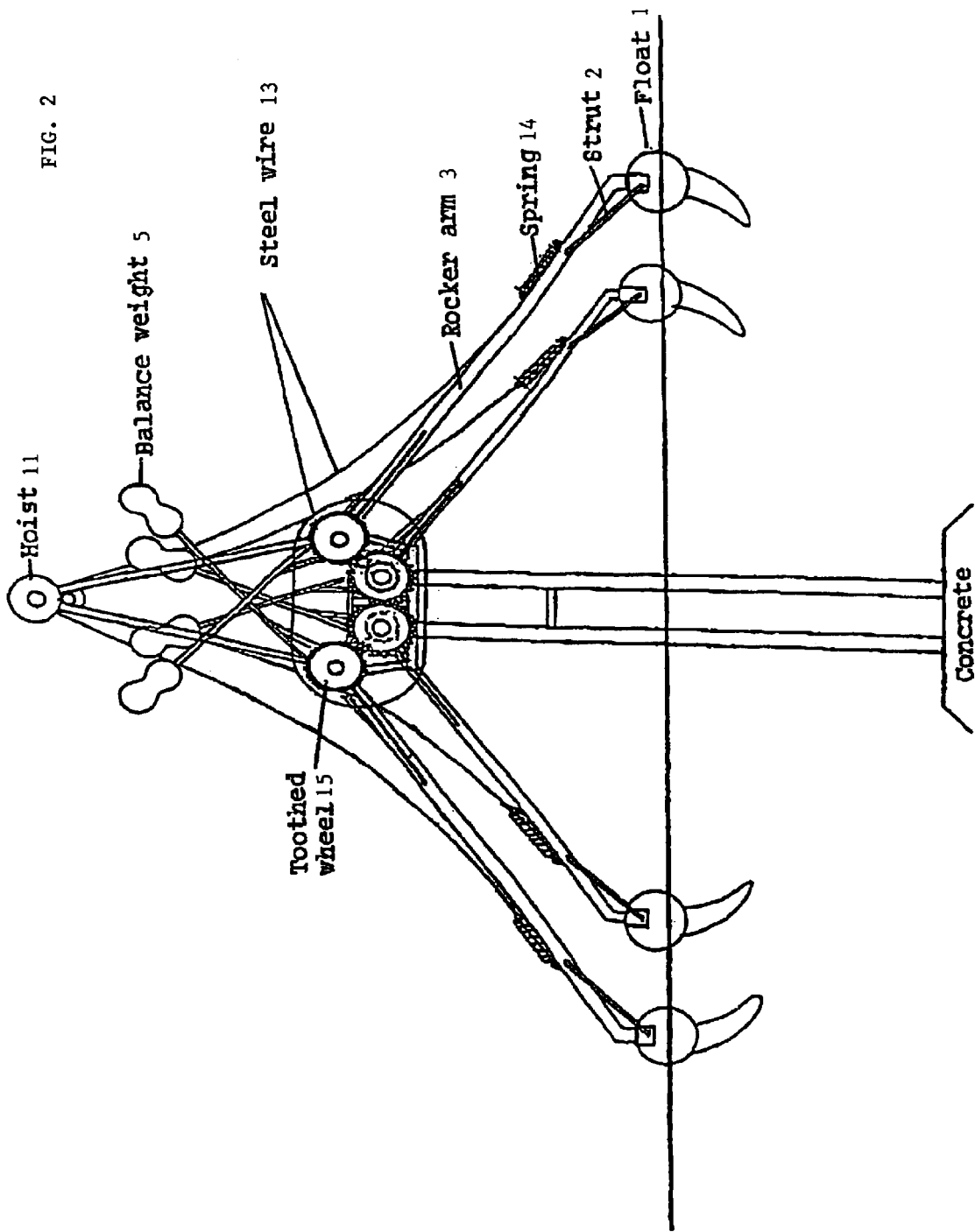
FIG. 2 is the wave force machine seen from one end, including electric hoist, balance weight, steel wire, shock absorber, floats, rocker arms and toothed wheels.

FIG. 2 shows the wave force machine seen from one end, illustrating the hoist 11 with steel wire 13 and shock absorber 14. The electric hoist can be activated from control box receiving information if the wind is too strong, the waves too high, the water temperature too low or in the case of any other predetermined activation, and thus raise rocker arms 3 and floats 1 from the water, so that the wave machine stops and thus is not destroyed. The toothed wheels 15 situated at the end of each driving shaft are interconnected, so the total force can be transferred to gearbox and electric generator.

Figure 3:
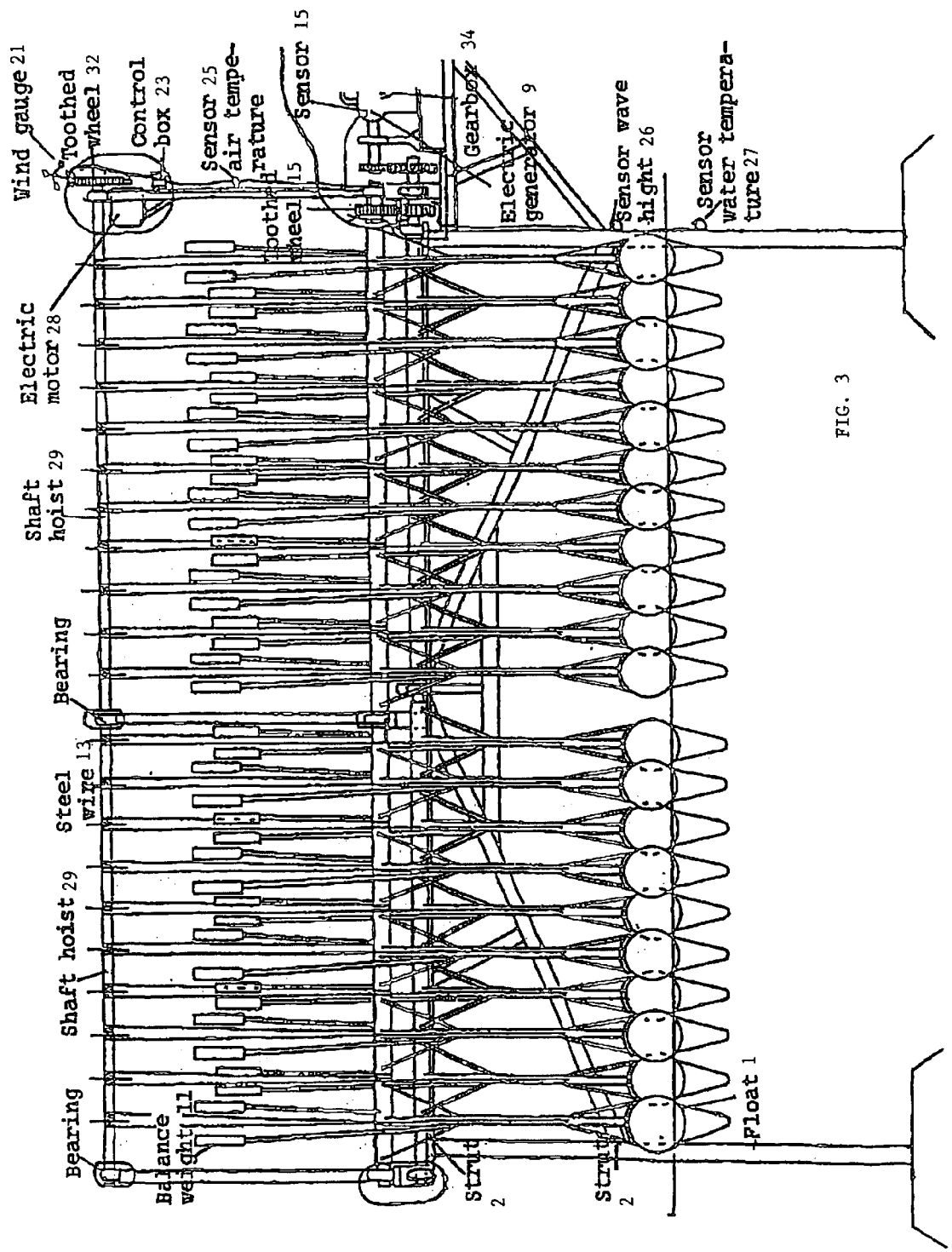
FIG. 3 is a side view of the wave force machine, including floats, rocker arms, balance weights, driving shafts, electric hoist, gearbox and electric generator.

FIG. 3 is a side view of the wave force machine with hoist. In which control box 23 collects information from anemometer 31, sensor 24 air temperatures sensor 25 temperature for heat in gearbox and electric generator, sensor 26 wave height and sensor 27 water temperature. If the control box 23 receives a signal of a predetermined maximum setting, e.g. too high wind velocity, too low air temperature, too high waves, too low water temperature, too high temperature in the gearbox and electric generator, or any other predetermined signal, the control box will pass a control signal on to the electric hoist, wherein electric motor 28 is connected by tooth wheel 32 to the shaft 29 which will rotate and cause the wire 13 to wind onto the shaft 29, and the rocker arms 3 will be pulled out of the water and the wave force machine will stop and not be destroyed by waves too high or other predetermined natural conditions.

Figure 4:
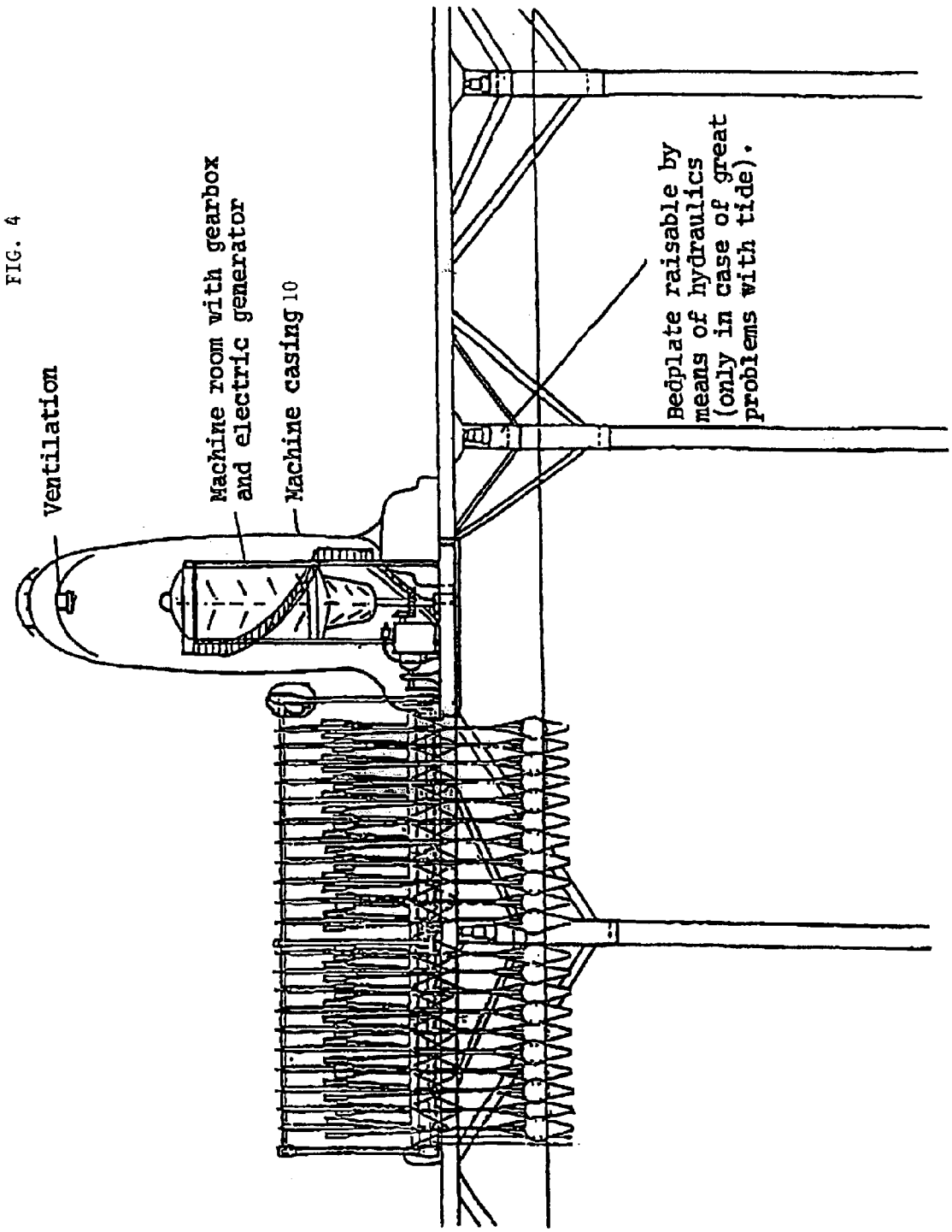
FIG. 4 is a side view of the wave force machine, including a suggestion as to how the force from the driving shafts can be transferred to gearbox and electric generator.

FIG. 4 is a aide view of the wave force machine, wherein the forces are gathered in e.g. a star point with e.g. three wave force machines to a gearbox and electric generator 1 encapsulated in a machine casing 10 and shown herein on a bedplate raisable by means of hydraulics. This system may be necessary if the wave force machine is set up in tidal areas.

Figure 5:
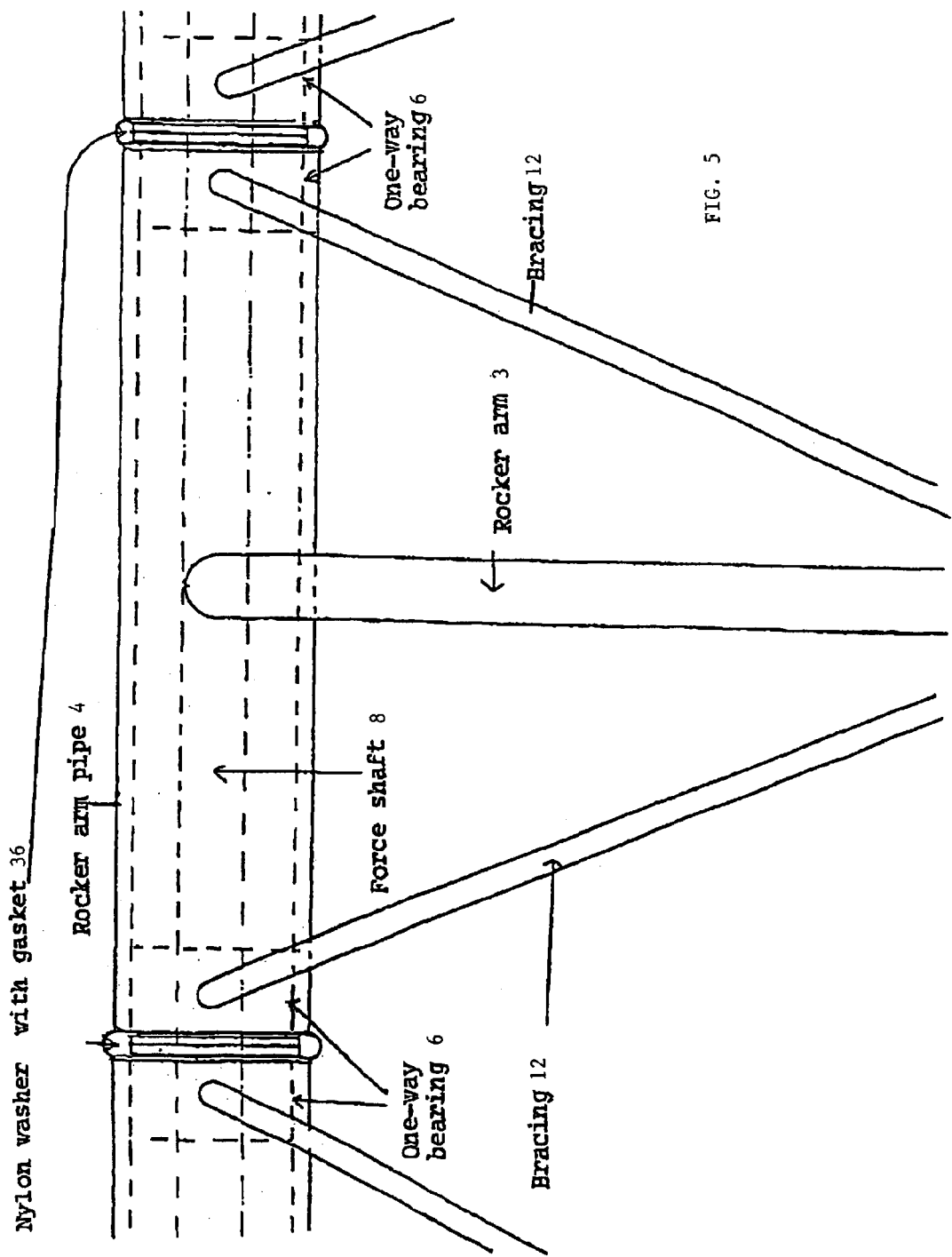
FIG. 5 shows rocker arm, rocker arm pipe, driving shaft, one-way bearings, bracing, adjusting nylon washers and gasket between the rocker arm pipes.

FIG. 5. When the float attached to the rocker arm 3 is affected by a wave, the rocker arm 3 will move upward and cause rocker arm pipe 4, one-way bearings 6 and the force shaft 8 to rotate. Free-wheeling occurs when the rocker arm dives into the wave. Bracing 12 capable of receiving the transverse forces from the rocker arm 3 reinforces the rocker arm 3. To prevent water from flowing into rocker arm pipe 4 and one-way bearings 6, 2 adjusting nylon washers with gasket 36 are mounted between each rocker arm pipe 4.

Figure 6A:
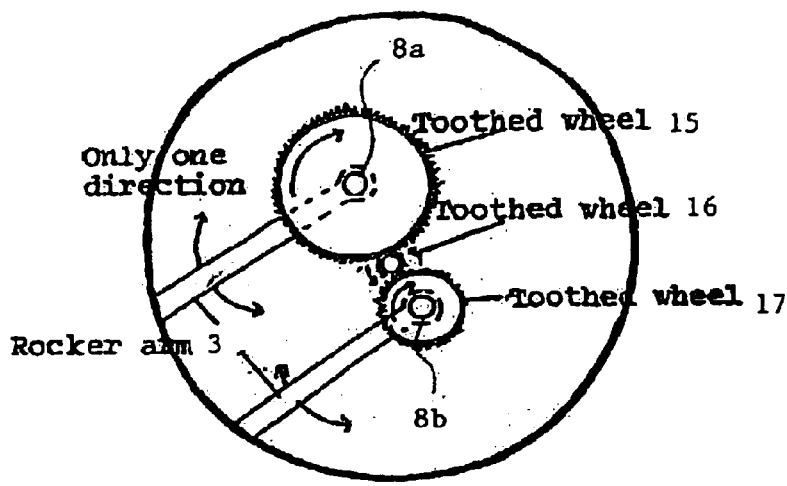
FIG. 6 shows how the ends of the driving shafts are connected to toothed wheels in such a manner that the total force can be transferred to gearbox and electric generator.
Figure 6B:
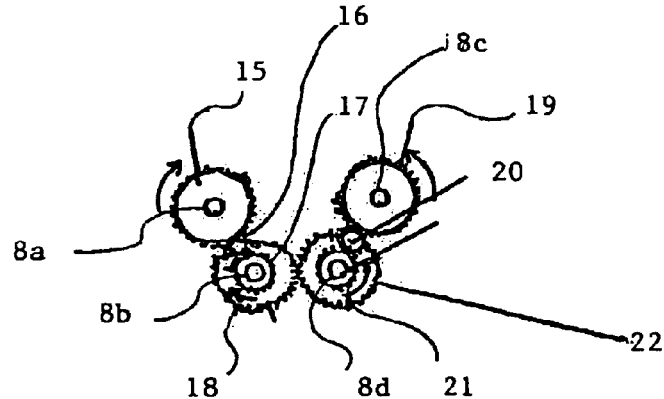
Figure 6C:
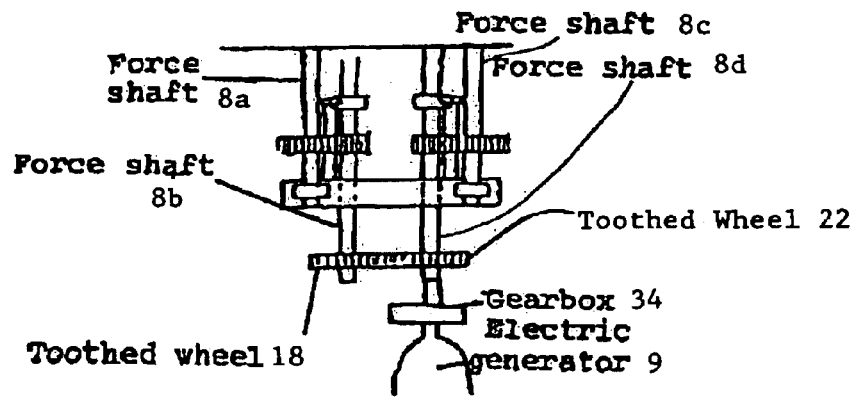
Figure 6D:
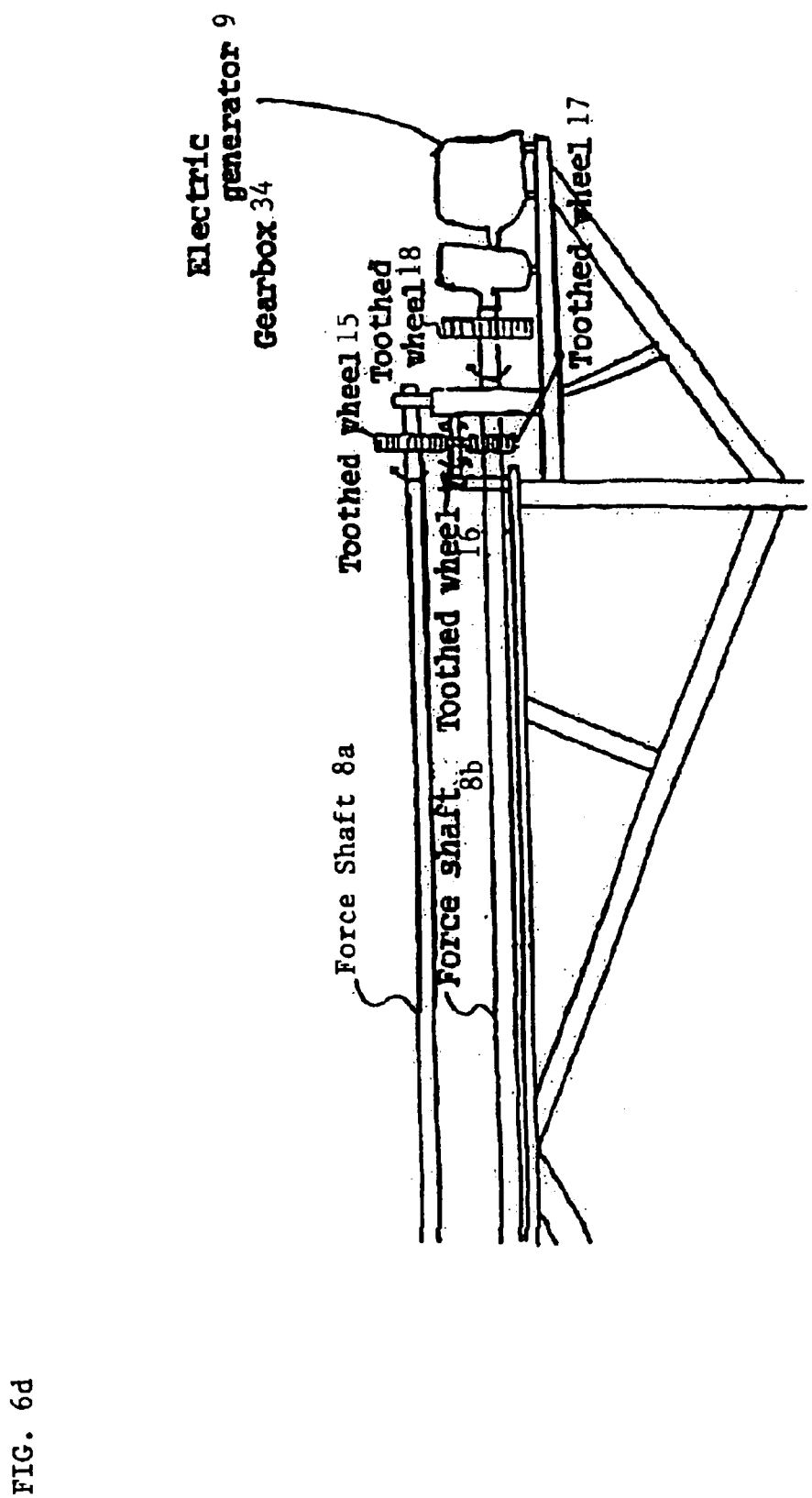

FIGS. 6a–d are front, side and top views of the shafts and toothed wheels of the wave force machine. The 2 front view drawings (FIGS. 6a–b) show how the force shafts 8a, 8b, 8c, and 8d are connected with toothed wheels 15–22. The wave force machine is shown here with 4 force shafts, but in principle it may be made up of any number of force shafts, both horizontally and vertically. The total force may e.g. be taken out on a force shaft and fed into gearbox 34 and on to electric generator 9. When the wave hits the float, causing the rocker arm to move upward, the various force shafts will rotate. And by interconnecting them by means of toothed wheels, the total force may be taken out and utilized in the production of electric. FIG. 6a shows the top toothed wheel 15 which has a somewhat lower rotation than the bottom toothed wheel 17 solved by means of a gearing. In, order to gather the force of the top shaft 8a and the bottom shaft 8b, so that they rotate in the same direction, a toothed wheel 16 is provided between them. The same principle is applied to force shafts 8c and 8d. Force shafts 8b and 8d are connected to the toothed wheels 18 and 22, and the total force is taken out on e.g. force shaft 8d to gearbox and electric generator.

FIG. 7 shows how gearbox 34 and electric generator 9 are placed in watertight machine casing 3. This is important in order to ensure that not toothed wheel, gearbox and electric generator are not destroyed by water, which is intake by fresh air intake piece 40.

FIG. 8 shows float 1 with fittings 37 and strut 2 and rocker arm 3 ending in rocker arm pipe 4 that is moved upward, when the wave hits float 1, together with rocker arm 3, causing rocker arm pipe to rotate lock bearings 6 into a tight position and the driving shaft 8 to rotate. Free-wheeling occurs when float and rocker arm dive into the wave. If the wave are too high, electric hoist and wire 13 are tightened and float and rocker are raised from the water, a shock absorber 14 being provided to relieve shock effects during raising and lowering.

FIG. 9 shows how several wave force machines may optionally be interconnected. Shown herein as a star which is in turn connected to another star. In principle, every wave force machine may be connected to form any combination. By connecting the machines in this manner, the entire system becomes less dependent on the direction of the waves. At the same time, reductions can be made with respect to gearbox, electric generator and concrete pillars. This renders the wave force machines more cost-effective.

Figure 10:
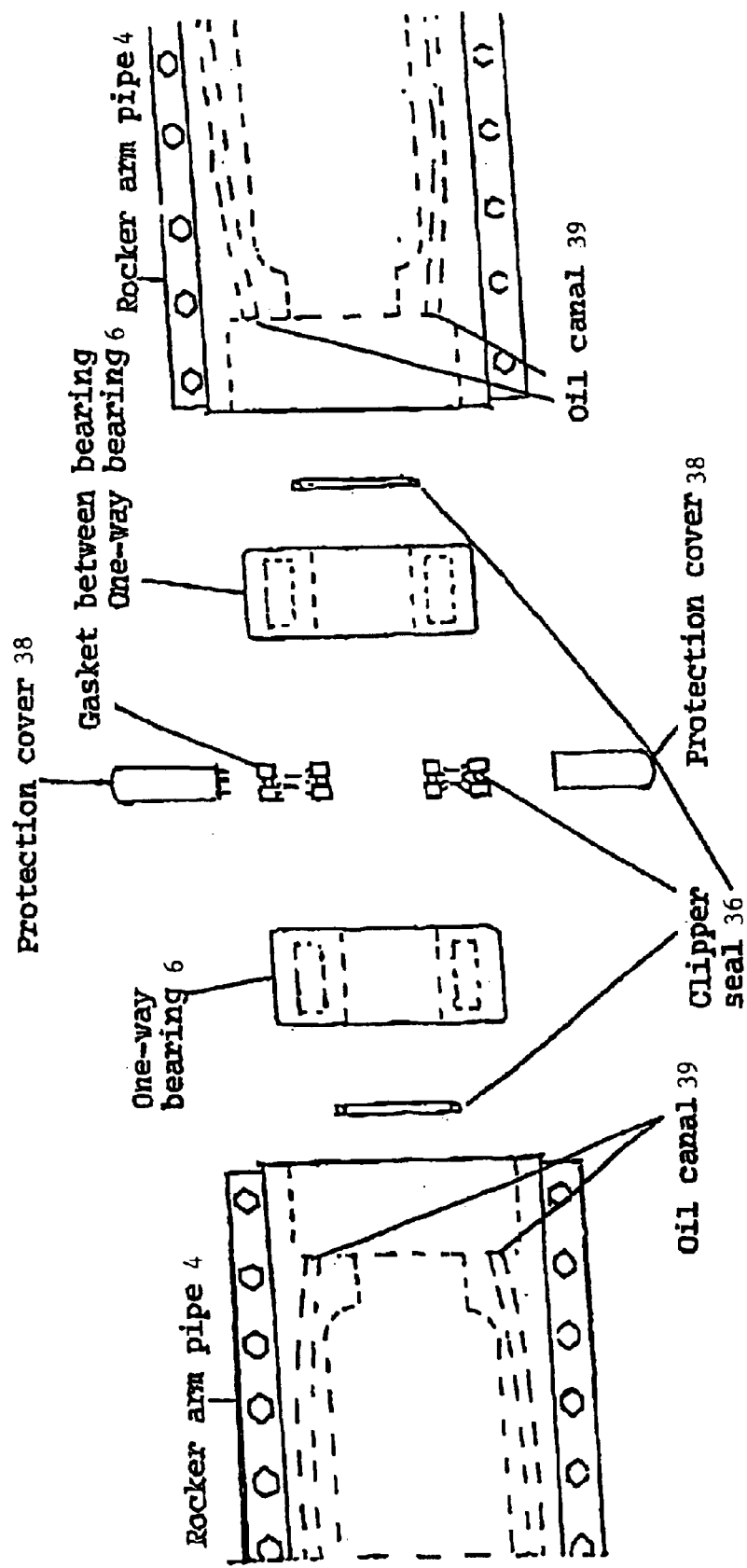
FIG. 10 shows rocker arm pipes including oil canals, clipper seat protection cover, one-way bearings and gasket between two bearings.

FIG. 10 in order to make the spacing between each rocker pipe 4 watertight, it is necessary to place clipper seal 36 between one-way bearings 6 and gasket between bearings 6 and on top of rocker arm pipe 4 a protection cover 38 keeping out the water, the entire system now being sealed off from intrusion of water. For cooling there are oil canals 39.

Figure 11:
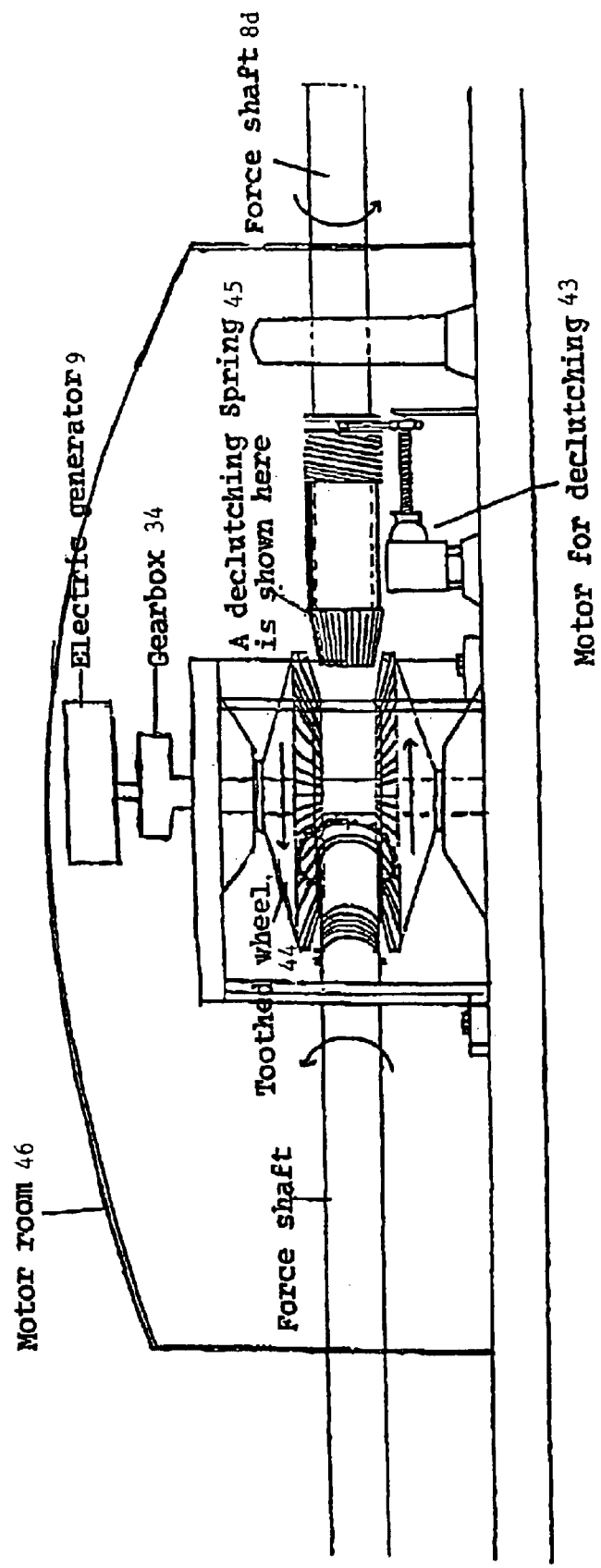
FIG. 11 is a side view of the centre of force, including force shafts, toothed wheels and declutching system.

FIG. 11 where the force shafts are joined in centre of force, it is shown how each force shaft can be deducted, if e.g. a gearbox or electric generator is to be repaired or something else happens that necessitates declutching. By means of a motor for declutching 43, the force shaft 8*d* may be removed from toothed wheel 44. When the force shaft is to engage once again with toothed wheel 44, motor declutching 43 it relieved, and spring 45 will ensure that the force shaft 8*d* falls into place in toothed wheel 44, the entire system being protected against water by a motor room 46.

Figure 12:
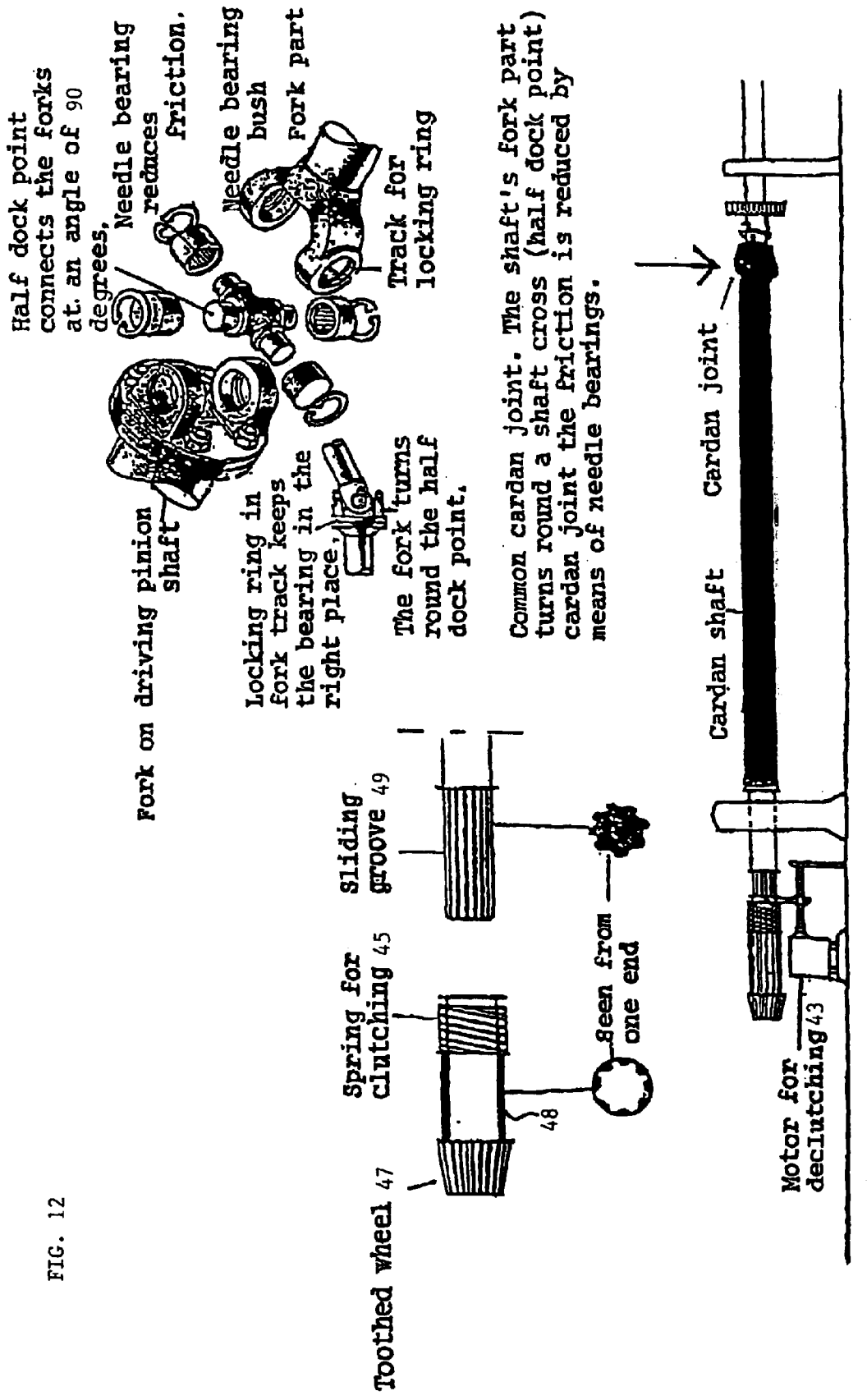
FIG. 12 is a side view of force shaft with cardan and motor for declutching.

FIG. 12 force shaft with cardan joint and declutching. Toothed wheel 47, sliding bush 4 and spring 45 are mounted over sliding grooves 49, motor 43 providing for clutching and declutching. By means of the system, each wave force machine may e.g. be declutched. In e.g. a large system with several gearboxes and electric generators, electric generators may be declutched as the waves diminish and the force from each individual wave force machine decreases, in order to continue the production of electricity, but with a smaller number of electric generators.

Figure 13:
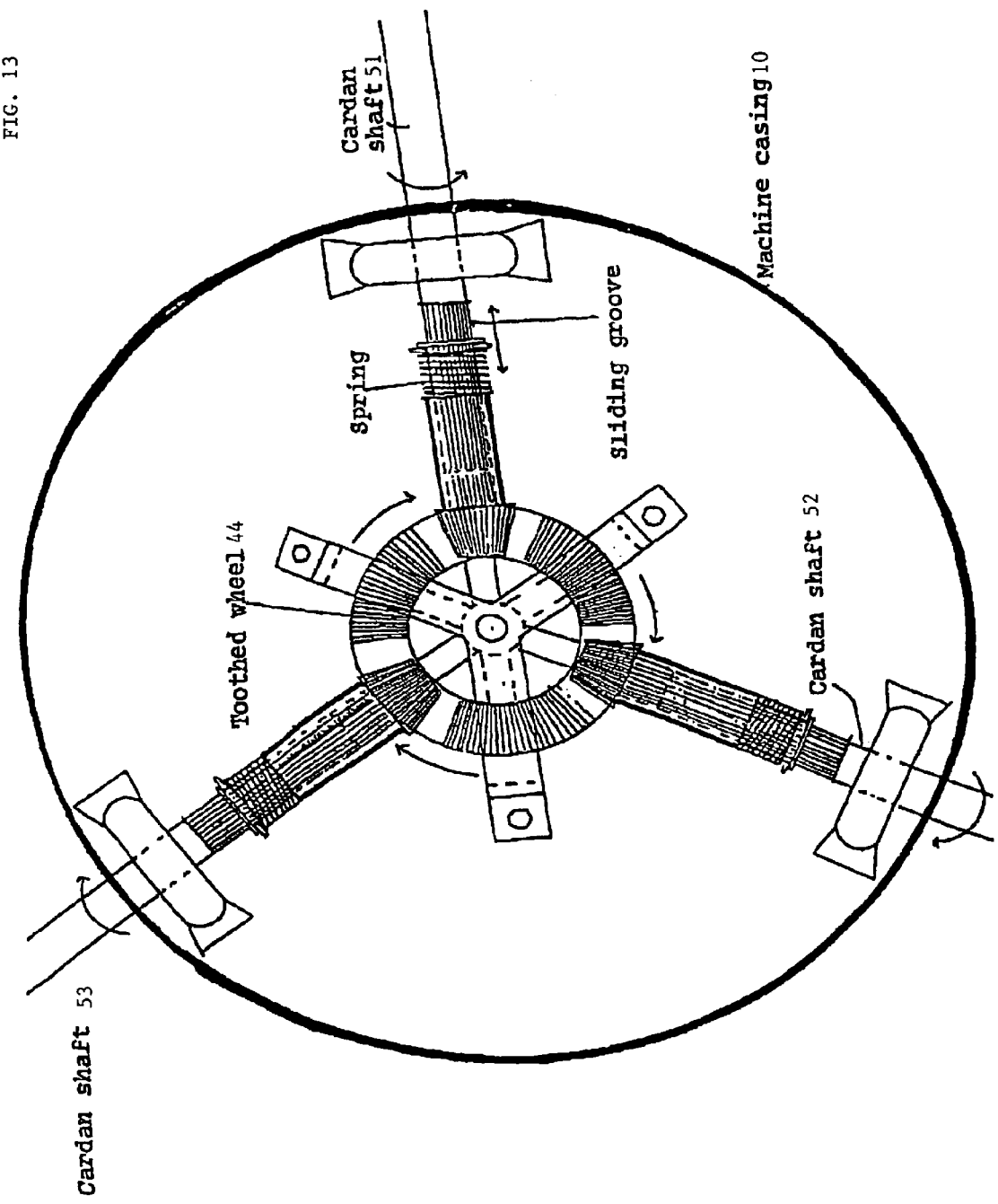
FIG. 13 is a top view of the centre of force of the three interconnected wave force machines with declutchings.

FIG. 13 shows a star point, shown herein with e.g. 3 wave force machines and 3 force shafts, cardan shafts 51–53, engaging with a common toothed wheel 44 capable of passing on the total force to gearbox and electric generator, everything being placed in a watertight machine casing 10.

Figure 14:
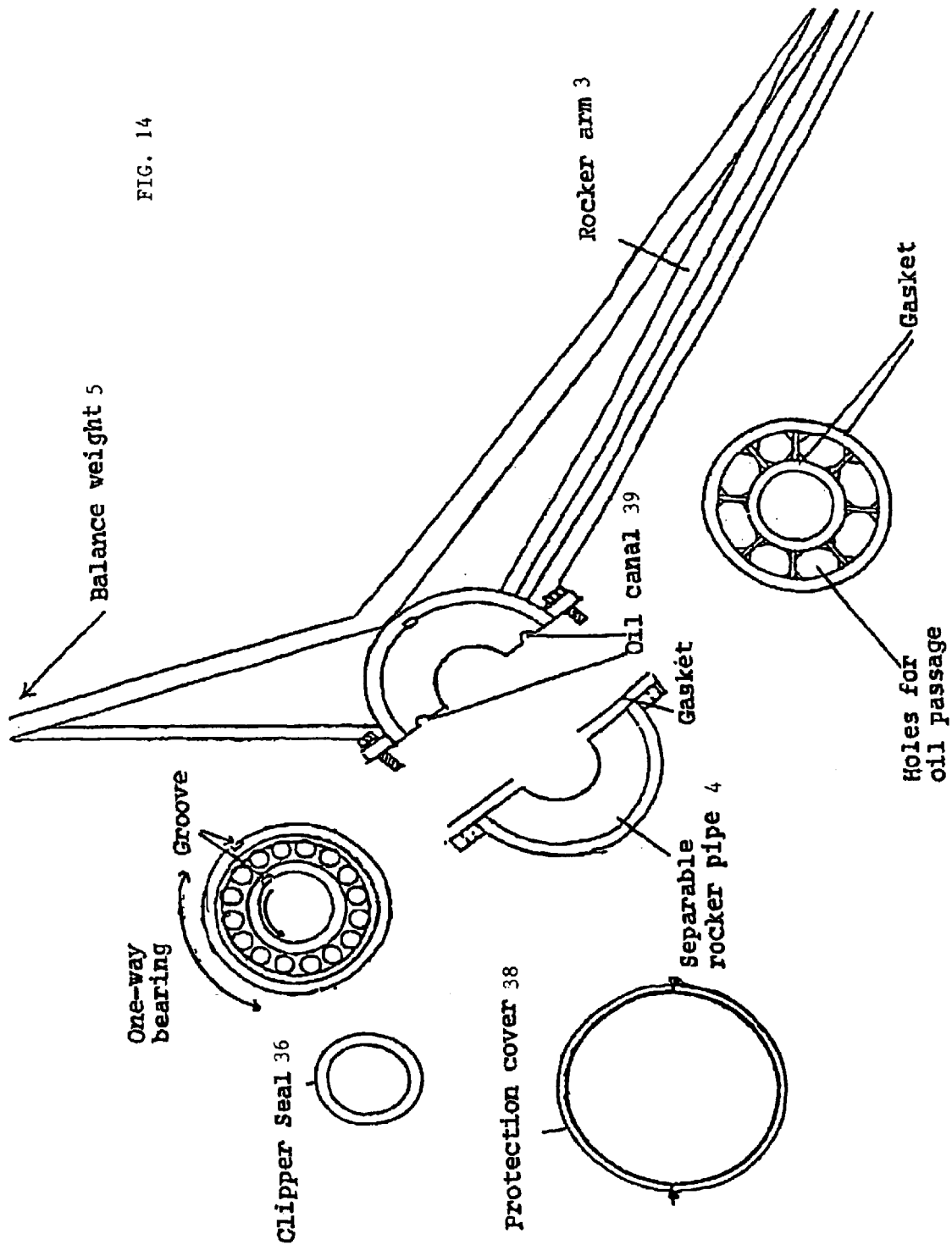
FIG. 14 is a side view of rocker arm pipe, including rocker arm, balance weight, one-way bearings, groove, clipper seal protection cover, separable rocker pipe, gasket, oil canal and holes for oil passage.

FIG. 14 shows a rocker arm 3 with balance weight 5, including separable rocker pipe with protection cover 38, so that water cannot intrude. This system provides the feature that if e.g. one bearing breaks, it is not necessary to detach the entire driving shaft and the individual one-way bearings and rocker arms, but only to remove the defective rocker arm.

Figure 15:
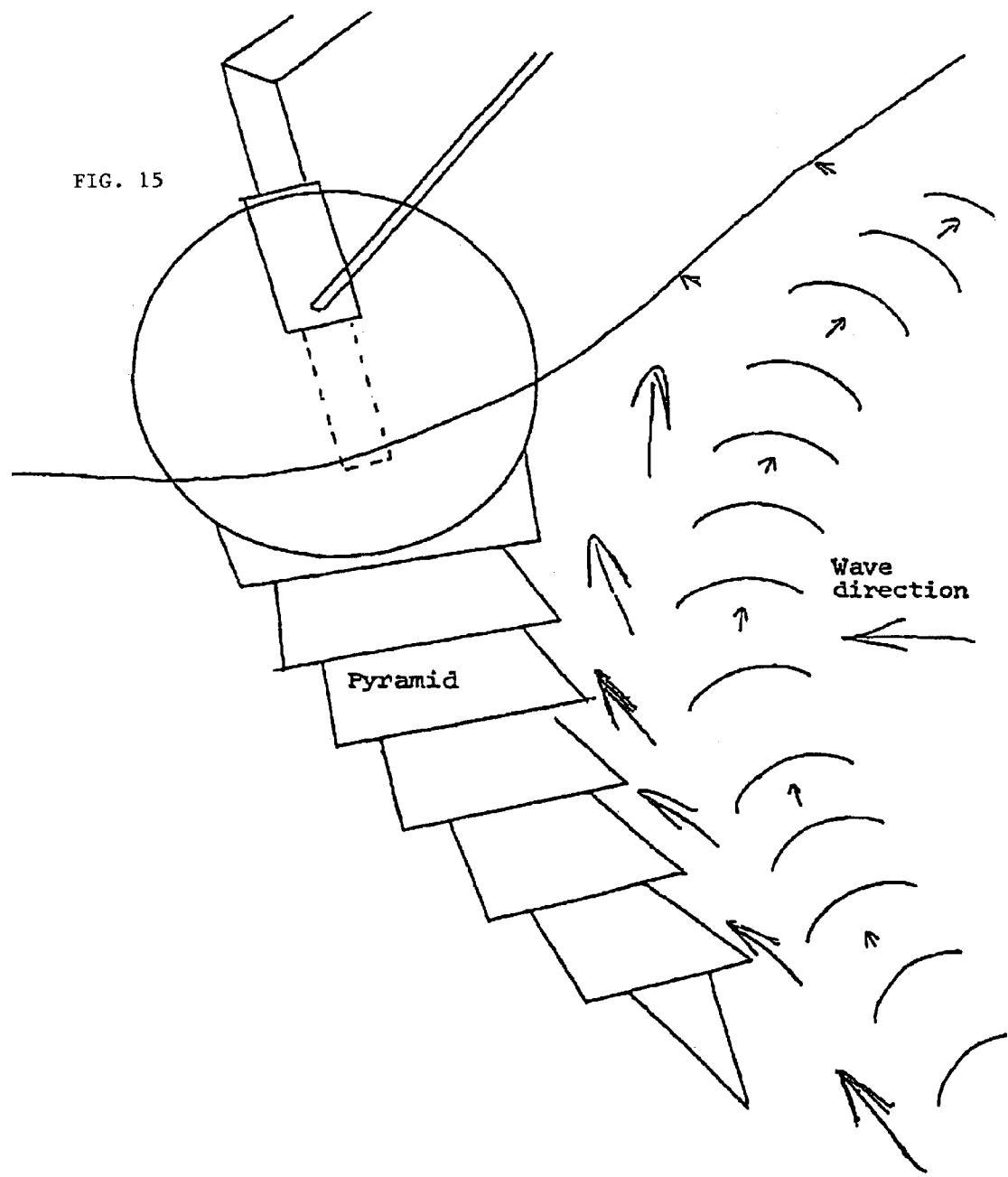
FIG. 15 shows a float.

FIG. 15 shows a float utilizing the upward force from the wave in a better and more efficient way.

Figure 16:
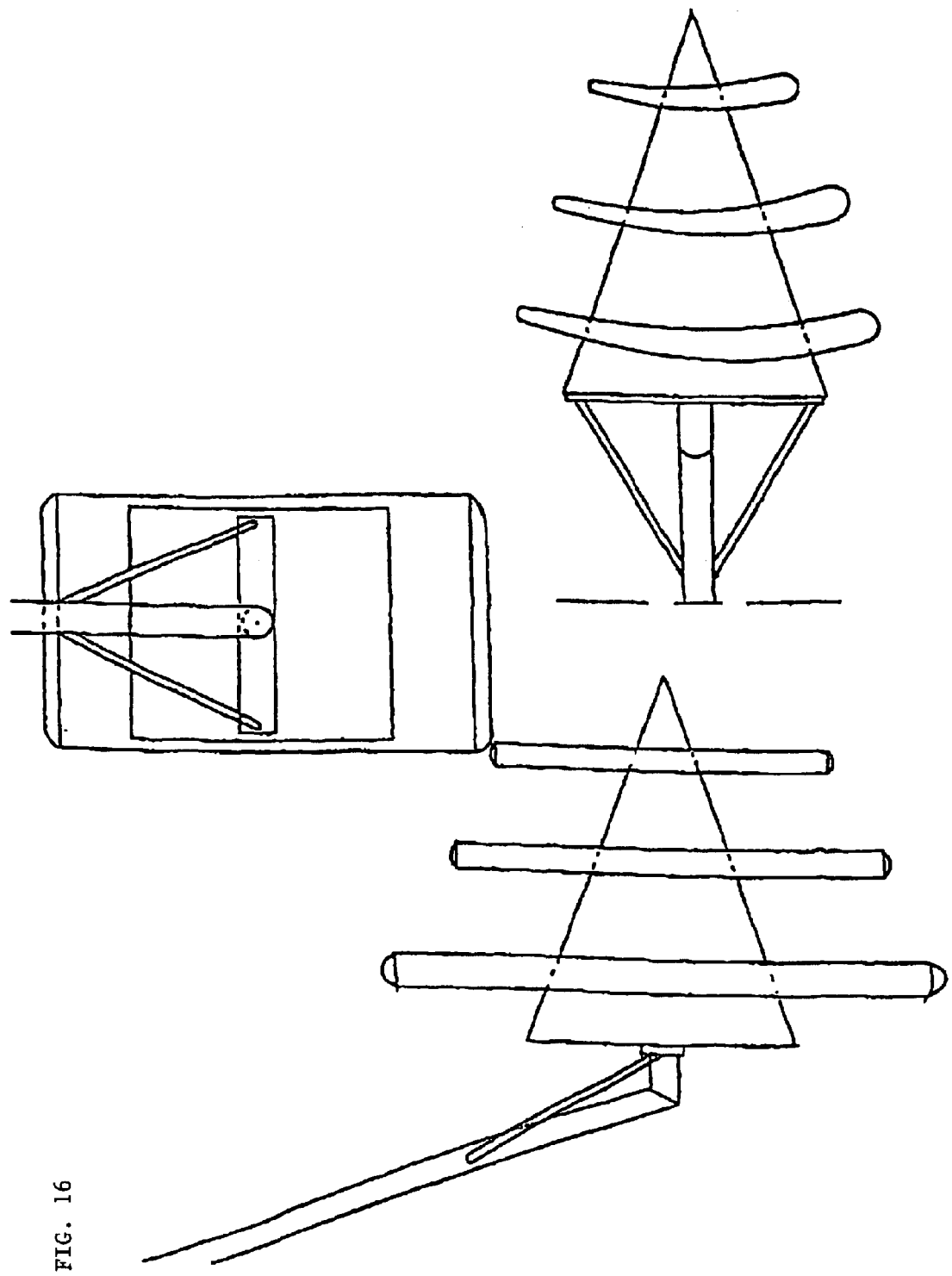
FIG. 16 shows a float with blade profile.

FIG. 16 shows a float, shown herein as a pyramid, on which, in this case, 3 blade profiles are mounted, but in principle any number of blade profiles may be mounted thereto. When the wave passes the float, an excess pressure will form above the blades, and this force will cause the float to move even more upward.

Figure 17:
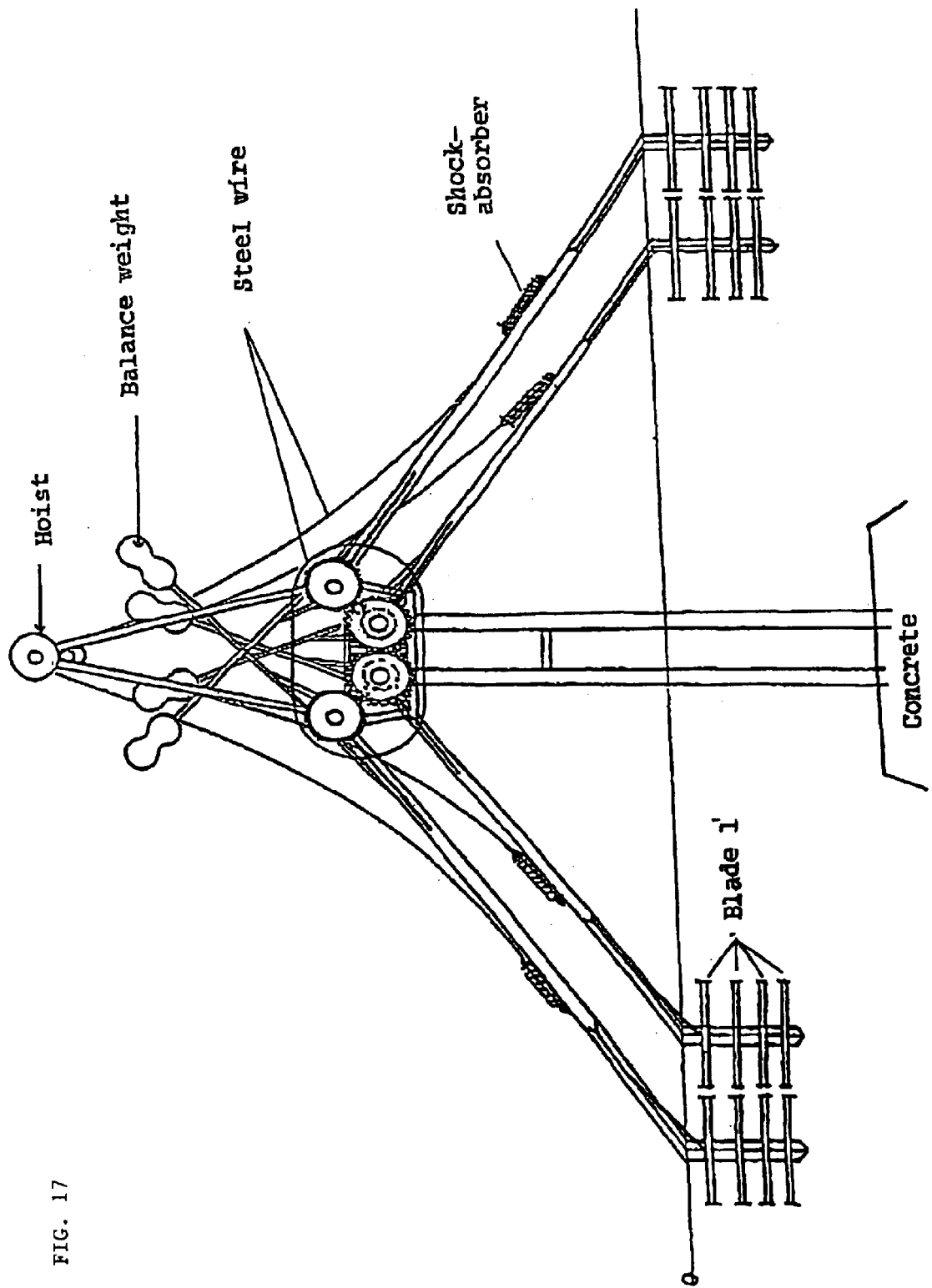
FIG. 17 shows wave force machine seen form one end mounted with floats mounted with blade profiles.

FIG. 17 shows the wave force machine provided with blade arms. Blade arms are intended to be used in waters with strong current, it could e.g. be in Lillebelt, a river bed or any other area of water current. The blades 1' function in the way that they can be turned upward or downward. This is controlled by means of a computer programme, so blades 1' are moving either upward or downward all the time.

Figure 18:
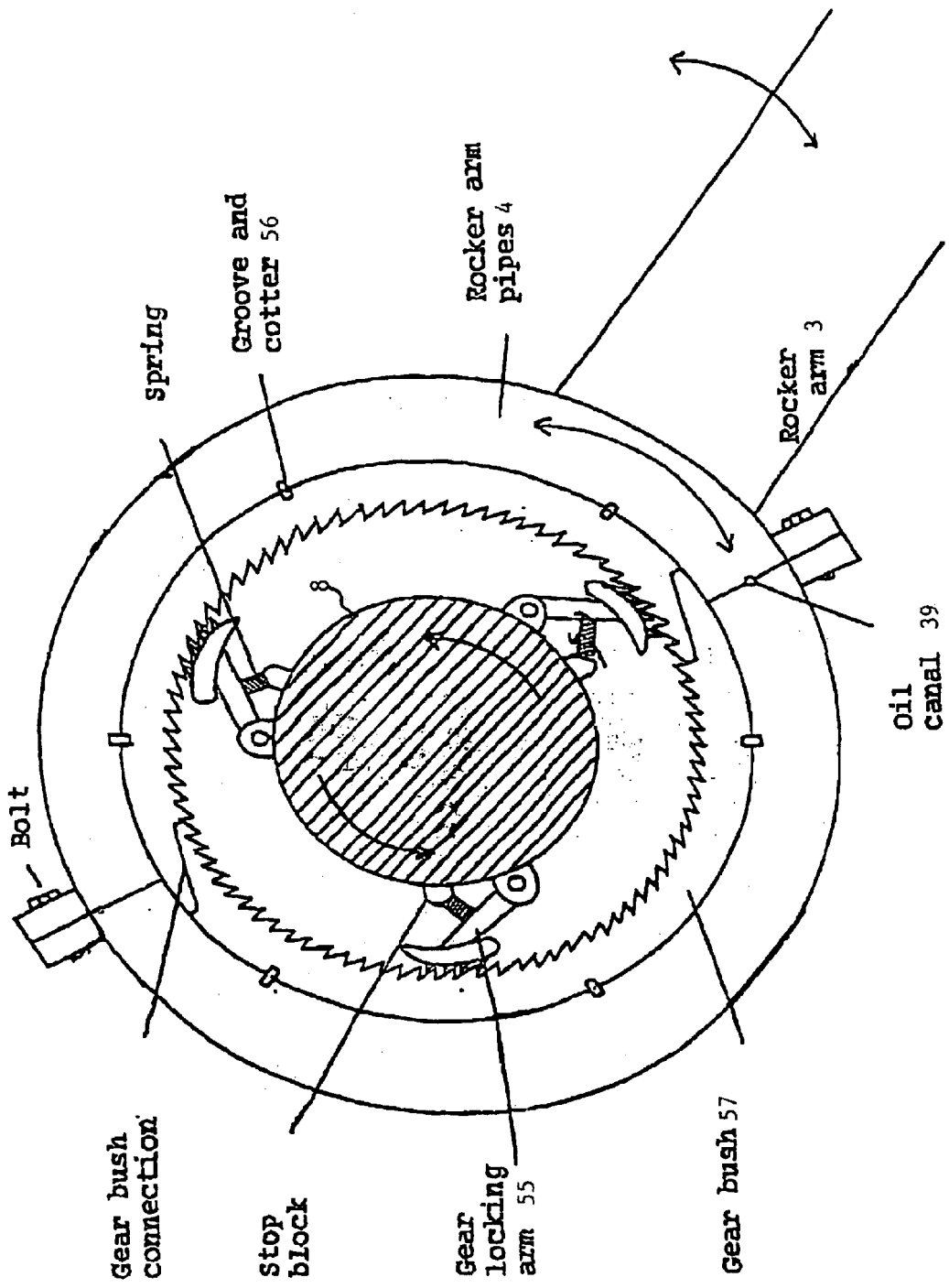
FIG. 18 shows rocker arm pipe with separable gear locking arms.

FIG. 18 shows rocker arm pipes 4 with gear locking arm 55. The advantage of using gear locking arms is that ordinary ball bearings can be used, said ball bearings being separable in both ends of the rocker arm pipe, and that everything is separable and replaceable in the case of defects. The gear bush is divided into two pieces held in place by means of groove and cotter 56. The gear locking arms 55 function in the way that the gear arms 55 are attached to the through-going force shaft 8*a*. When the rocker arms 3 start moving up and down, the gear arms engage with the gears of the two-piece gear bush 57 immediately, causing the shaft 8*a* to start to rotate. The teeth of the gear arm are positioned closer together than the teeth of the two-piece gear bush, providing a quicker firm grip, everything being operated in grease, which means that no maintenance is required.

Figure 19:
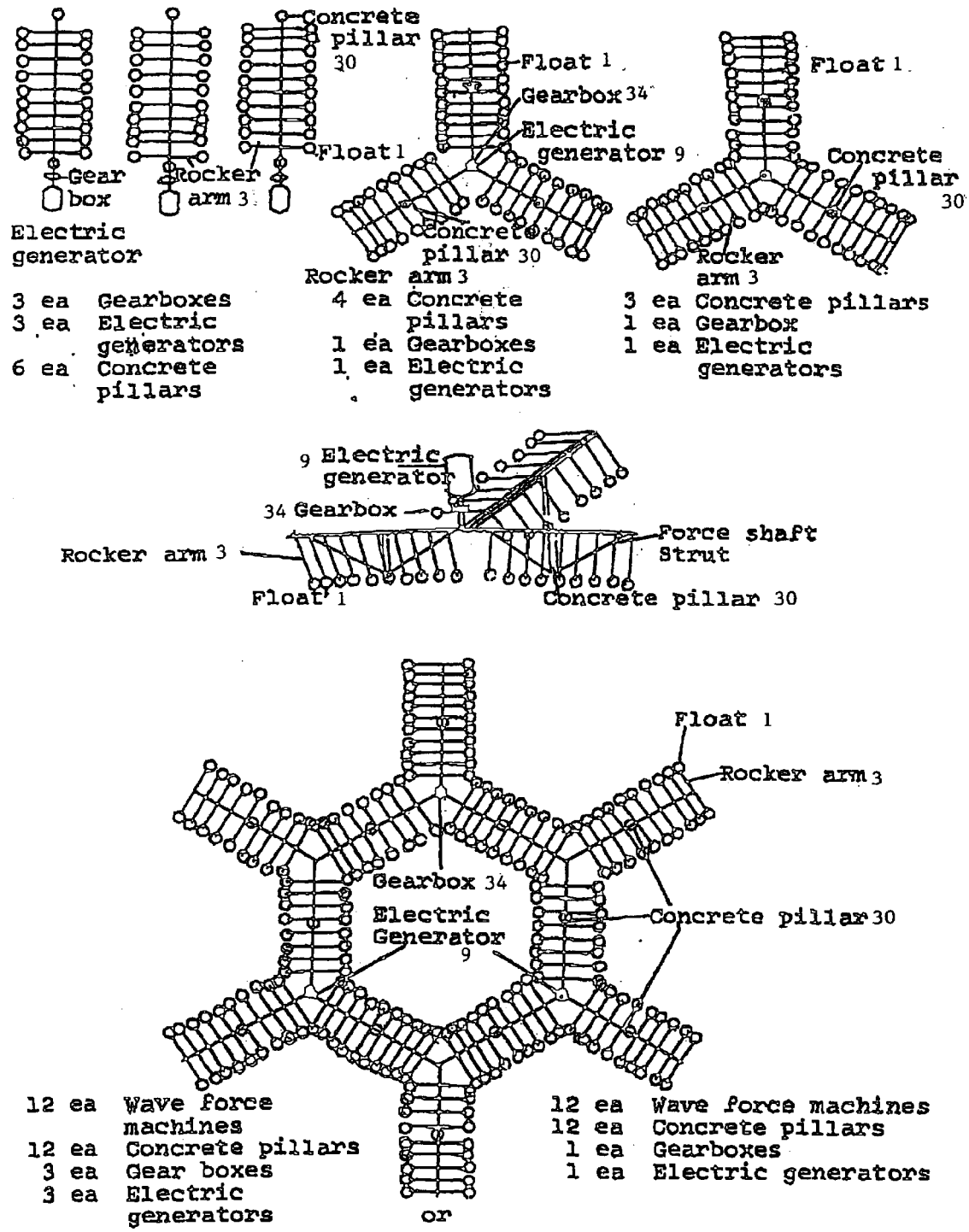
FIG. 19 shows wave force machines standing separately, forming a star and a hexagon.

FIG. 19 shows suggestions as to different ways of interconnecting the wave force machines. By e.g. interconnecting 3 wave force machines to form a star, it is rendered more independent from the direction from where the waves are coming. At the same time a gearbox and electric generator may be placed in the star point. This is a reduction of 2 gearboxes and electric generators, as opposed to each wave force machine being placed separately. At the same time the number of concrete pillars may be reduced. In the case of three separate wave force machines, 6 concrete pillars are used. By placing them to form a star, this number may be reduced to 3 concrete pillars, providing considerable cast-savings. As shown at the bottom of FIG. 19, 12 wave force machines may also, as shown herein, be joined to be interconnected, and the force is transferred to the 3 gearboxes 34 an on to electric generator 9. Only 12 concrete pillars are required in this shown situation. But in principle the wave force machines may be interconnected in any war and by use of any number of concrete pillars, gearboxes and electric generators.

Figure 20:
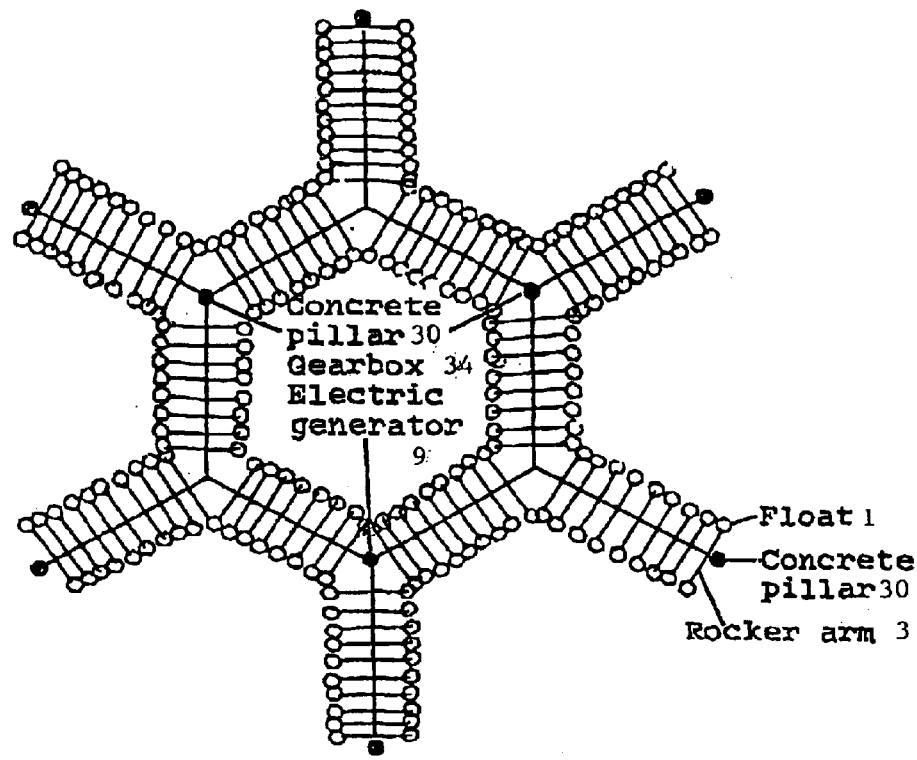
FIG. 20 shows wave force machines connected to form a hexagon with a reduced number of concrete pillars, gearboxes and electric generators.

FIG. 20 shows 12 wave force machines having 9 concrete pillars 30, 3 gearboxes 34 and 3 electric generators 9, resulting in a further reduction of concrete pillars and thus providing cast-savings and more cost-effective production machinery. But in principle the wave force machine can be interconnected to form any combination.

Figure 21:
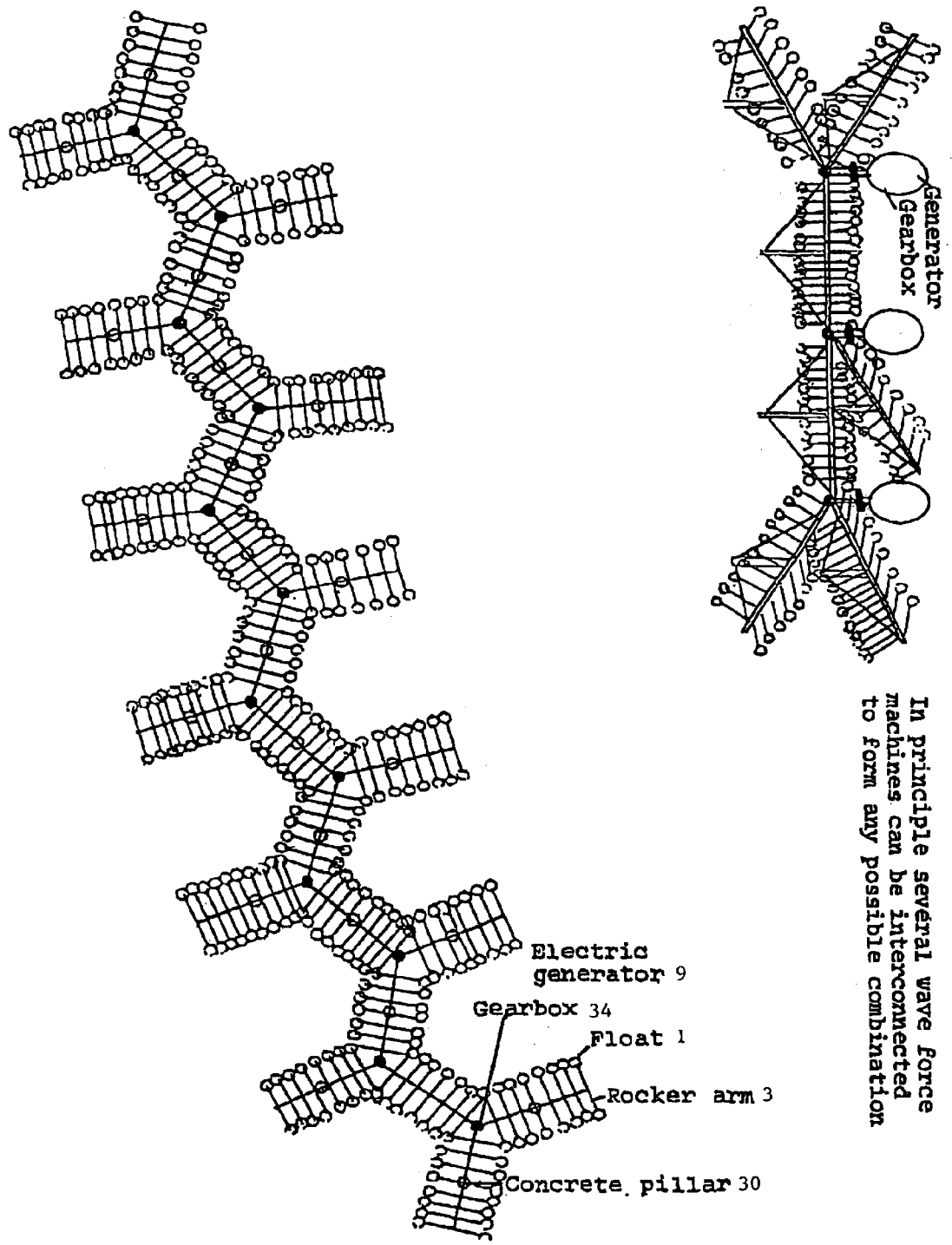
FIG. 21 shows wave force machines connected as star points next to each other in a long line.

FIG. 21 shows another way of interconnecting the wave force machines. But in principle they can be interconnected to form any conceivable combination.

Figure 22:
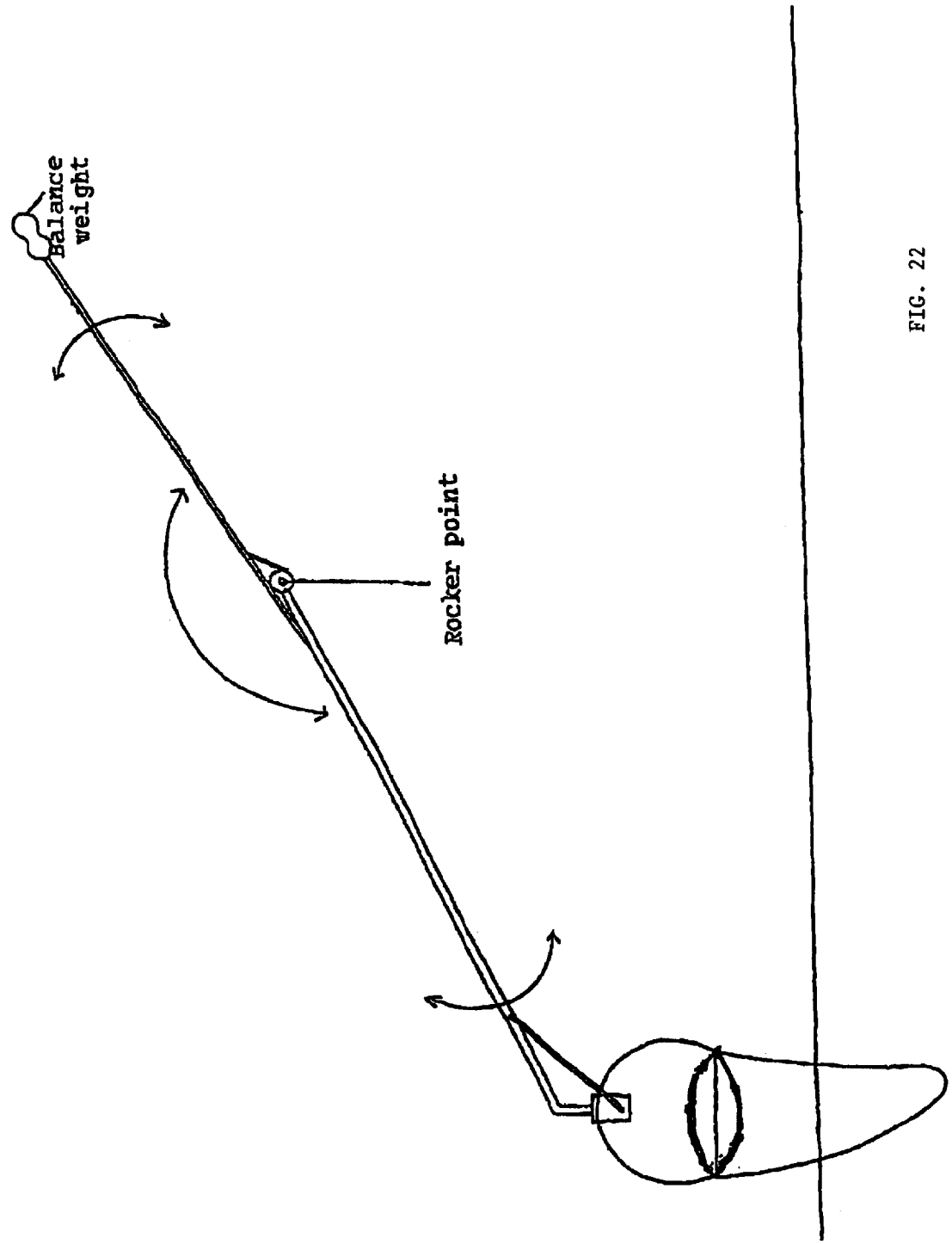
FIG. 22 shows a rocker arm including float, rocker arm and arm with balance weight.

FIG. 22 shows a rocker arm with float, rocker arm and arm with balance weight for balancing the weight on the float side, as the upward force increases and is utilized in a better way.

What is claimed is:

1. A wave force machine capable of utilising the upward force from the waves on a plurality of adjacent floats, wherein the upward force on each float via rocker arm, bearings and free-wheeling means is transferred to driving force shaft for transferring the moment to the driving force shaft, wherein the bearings are enclosed between rocker arm pipes and the driving force shaft, and the bearings are displaced in a longitudinal direction of the driving force shaft from the position normal to the float.

2. A wave force machine according to claim 1, wherein the bearings are displaced as much as possible with respect to adjacent rocker arm pipes.

3. A wave force machine according to claim 1, wherein the rocker arms each has two bracing arms attached to the rocker arm pipe, the bracing arms being attached near the longitudinal position of the bearings.

4. A wave force machine according to claim 1, wherein the plurality of rocker arm pipes constitute a substantially closed tube enclosing the driving force shaft.

5. A wave force machine according to claim 1, wherein each rocker arm is connected to a separate rocker arm pipe.

6. A wave force machine according to claim 1, wherein one or more gear locking arms is/are provided within each rocker arm pipe, each gear locking arm being attached to driving force shaft, the gear locking arms engage with gear bush attached in rocker arm pipe by means of groove with cotters.

7. A wave force machine according to claim 1, comprising two parallel driving force shafts having floats extending to opposite sides of the machine.

8. A wave force machine according to claim 1, wherein each float is a round buoy with a conical hopper.

9. A wave force machine capable of utilising the upward force from the waves on a plurality of adjacent floats, wherein the upward force on each float via rocker arm, bearings and free-wheeling means is transferred to driving force shaft for transferring the moment to the driving force shaft, wherein a first group of floats is arranged at a first normal distance from a first driving force shaft and a second group of floats is arranged at a second normal distance from a second driving force shaft, the first normal distance being different from the second normal distance.

10. A wave force machine according to claim 9, wherein the first and the second shaft are in driving engagement via an intermediate engagement wheel.

11. A wave force machine according to claim 9, wherein a gearing between the first and the second shaft is adapted for the difference in normal distance for the group of floats.

12. A wave force machine according to claim 9, wherein the second driving force shaft is parallel to the first driving force shaft and the second group of floats extends to the same side as the first group of floats.

13. A wave force machine according to claim 9, comprising two parallel first driving force shafts having floats extending to opposite sides of the machine and two parallel second driving force shafts having floats extending to opposite sides of the machine.

14. A wave force machine according to claim 9, comprising two parallel driving force shafts having floats extending to opposite sides of the machine.

15. A wave force machine according to claim 9, wherein each float is a round buoy with a conical hopper.

16. A wave force machine capable of utilising the upward force from the waves on a plurality of adjacent floats, wherein the upward force on each float via rocker arm, bearings and free-wheeling means is transferred to driving force shaft for transferring the moment to the driving force shaft, comprising balance weights connected to the rocker arms for partly outbalancing the force of gravity on the float and the rocker arm.

17. A wave force machine according to claim 16, further comprising hoist means for raising the rocker arms.

18. A wave force machine according to claim 17, wherein the hoist means acts via a wire and a shock absorber attached to each rocker arm.

19. A wave force machine according to claim 17, and comprising a control box for controlling the hoist, said control box including anemometer, sensor for air temperature sensor for gearbox temperature and electric generator, sensor for wave height and sensor for water temperature.

20. A wave force machine according to claim 16, comprising two parallel driving force shafts having floats extending to opposite sides of the machine.

21. A wave force machine according to claim 16, wherein each float is a round buoy with a conical hopper.

22. A system of at least three wave force machines according to claim 1 or 9 or 16, the wave force machines having different orientation, wherein the wave force machines are interconnected to form a star, a hexagon or any other combination.

23. A system according to claim 22, wherein the wave force machines having common means for utilizing the force from the waves.

* * * * *